UNITED STATES PATENT OFFICE.

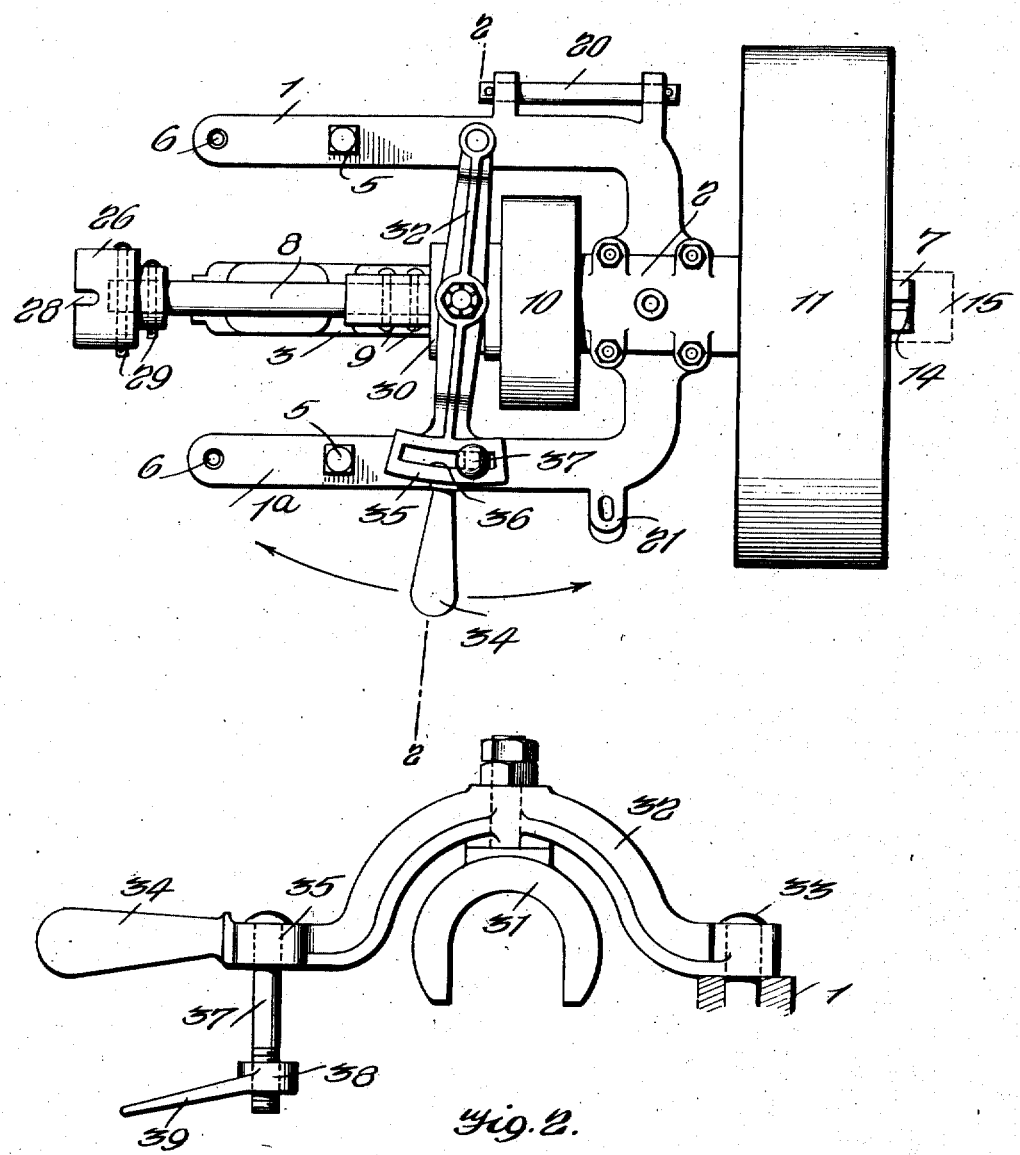

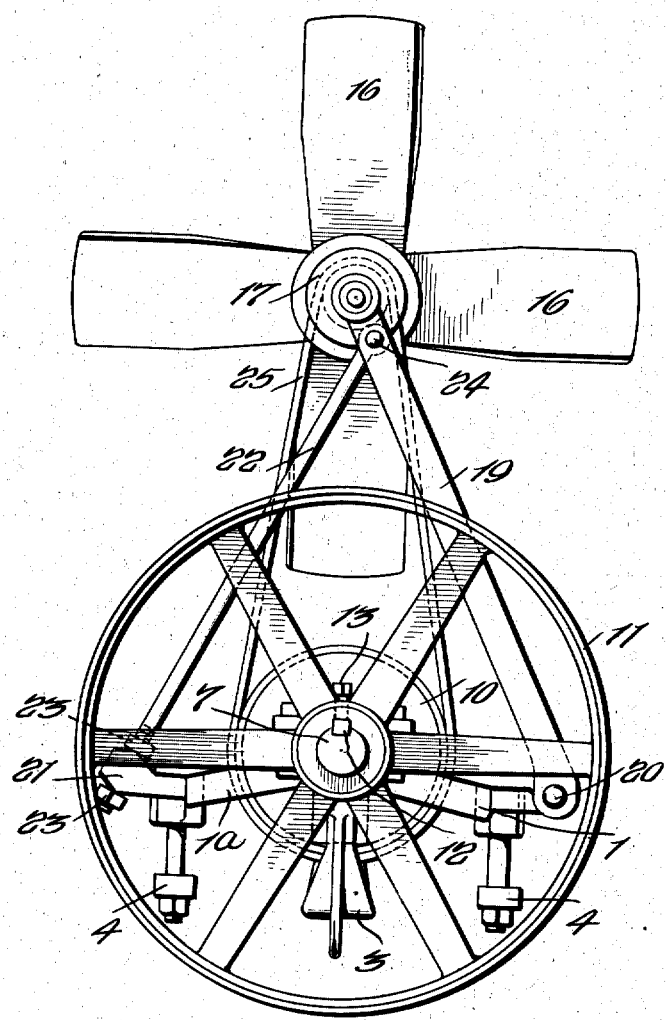

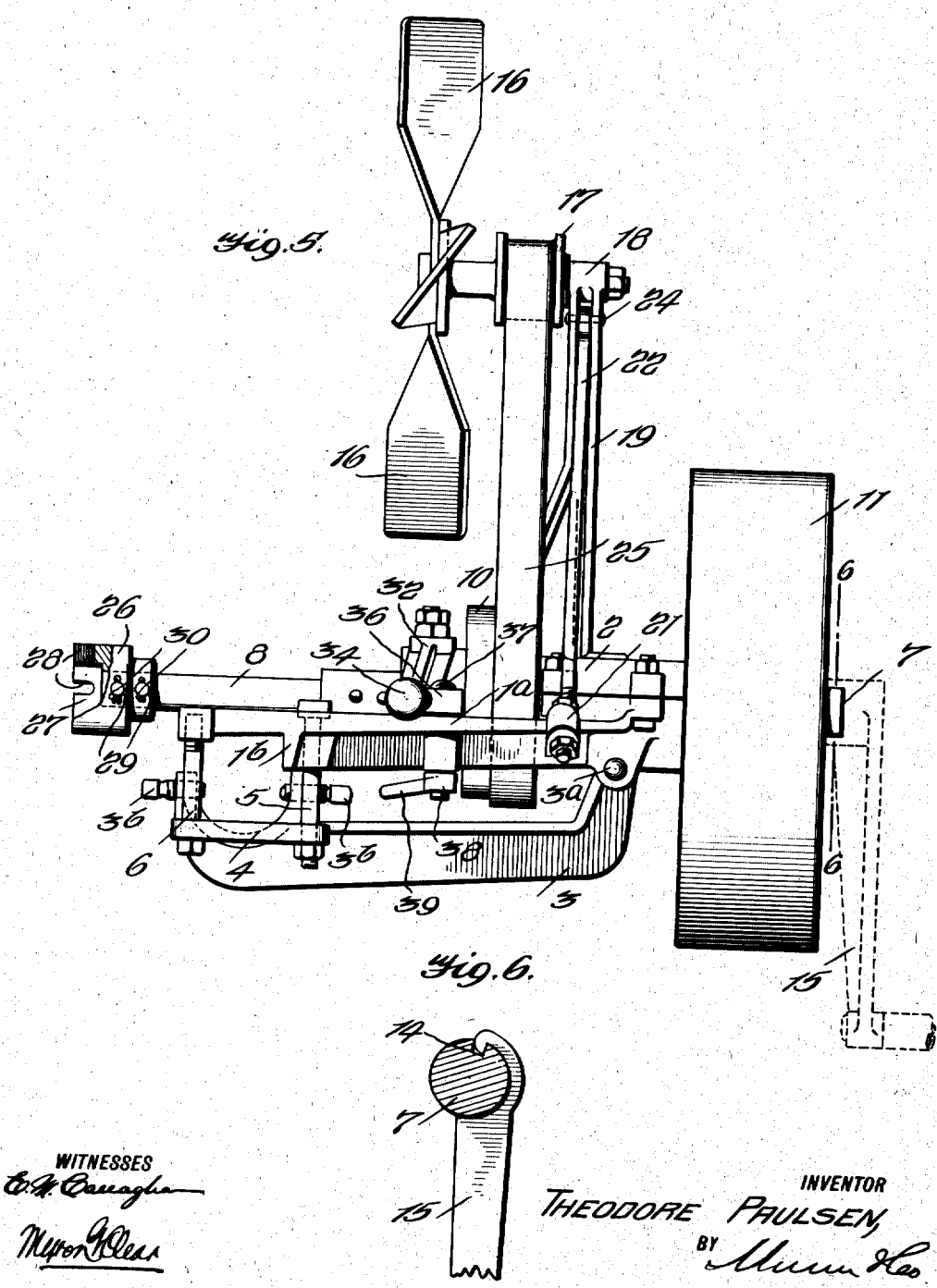

THEODORE PAULSEN, OF SEDRO WOOLLEY, WASHINGTON.

STATIONARY POWER-TRANSMITTING ATTACHMENT FOR AUTOMOBILES.

1,254,844.  Specification of Letters Patent.  Patented Jan. 29, 1918.

Application filed January 23, 1917. Serial No. 143,926.

*To all whom it may concern:*

Be it known that I, THEODORE PAULSEN, a citizen of the United States, and a resident of Sedro Woolley, in the county of Skagit and State of Washington, have invented a certain new and useful Improvement in Stationary Power - Transmitting Attachments for Automobiles, of which the following is a specification.

My present invention relates generally to automobile attachments, and more particularly to power transmitting attachments for detachable engagement with an automobile frame, whereby the power of the automobile motor may be transmitted and utilized at an external point when the automobile is at a standstill, my object being to provide a simple, strong, durable, and practical arrangement having the novel construction and advantages to be hereinafter brought out.

In the specification to follow, reference is made to the accompanying drawing, forming a part of this specification, and wherein—

Figure 1 is a top plan view of the frame and appurtenances of my improvements, with the fan and its support removed;

Fig. 2 is a vertical transverse sectional view, taken substantially on line 2—2 of Fig. 1;

Fig. 3 is a front elevation;

Fig. 4 is a detail section through a portion of the frame to be hereinafter more fully described;

Fig. 5 is a side elevation, and Fig. 6 is a detail vertical section taken substantially on line 6—6 of Fig. 5.

Referring now to these figures, my improvements embody a main U-shaped frame, of which the extensions are indicated at 1 and 1$^a$, and particularly seen in Fig. 1 the frame having at a forward central point an enlarged bearing 2, below which, and to the frame, is pivotally connected, at 3$^a$, the forward end of a central lower supporting arm 3, both the bearing 2 and the supporting arm 3 projecting in the direction of the longitudinal axis of the main frame.

The rear ends of the extensions 1 and 1$^a$ are shouldered at 1$^b$ as best seen in Fig. 5, and are provided with clamping plates 4, held in adjustable connection therewith by bolts 5 and cap screws 6 whereby to secure the shouldered rear ends 1$^b$ of the frame extensions to the forward cross bar of the frame of an automobile, the frame of my attachment being made sufficiently strong to withstand any heavy side strain, and being supported in a straight line horizontally under loads by means of the supporting arm 3, the inner end of which is adapted for engagement with the lower portion of the forward cross bar of the automobile frame, between the clamps 4, and is provided with opposed set screws 3$^b$, whereby to adjustably engage the said cross bar for the purpose just above mentioned.

Through the bearing 2 of the main frame of my improved attachment, is extended the forward enlarged point 7 of a longitudinally shiftable shaft, the rear portion 8 of which, axially alined with the forward portion 7, and riveted or otherwise secured to the same as at 9, in Figs. 1 and 5, is of considerably reduced diameter to permit of the use of the same through the crank boxing of the automobile frame, the forward enlarged portion 7 providing for increased bearing surface in the bearing 2, and eliminating the necessity of especial strength in the character of the material of which it is made, as in the case of the rear portion 8. The forward portion 7 of the shaft carries a pulley 10 within the main frame of my improved attachment, and is provided forwardly beyond the bearing 2 with a second and larger pulley 11, the latter of which is keyed to the shaft by a loose key 12, as seen in Fig. 3, held in place by a set screw 13, the forward portion of the keyway 14 of the shaft 7 providing for the engagement of a starting crank 15, as seen in Fig. 6.

Above the frame of my improved attachment is a fan 16, which directs its current rearwardly, and whose shaft is provided with a pulley 17 and is journaled through the upper end, at 18, of a supporting arm 19, the lower end of which is journaled upon a bearing pin 20, as seen in Fig. 1, carried by the extension 1 of the main frame, the opposite extension 1$^a$ having an apertured lug 21 in which the lower threaded end of an adjusting rod 22 is held by means of clamping nuts 23, as seen in Fig. 4. The upper end of the adjusting rod 22 is pivotally connected to the supporting arm 19 by means of a rivet or the like 24, as seen in Fig. 3, and the pulley 17 of the fan being connected by a belt 25 with the pulley 10 of the shaft 7, the tension of the belt 25 may be regulated by adjustment of the rod 22 at its before-mentioned connection with the extension 1ª of the frame.

The rear end of the portion 8 of the shaft, cylindrical to its extremity, is extended within the smaller cylindrical bore of a clutch member 26, the latter having a rear enlarged bore 27, with pairs of slots 28 at right angles to one another, the slots of each pair of which are opposed, as seen by a comparison of Figs. 1 and 5, the said bore 27 receiving the forward end of the motor shaft and the slots 28 receiving the usual starting pins thereof, so as to thus form a double-jaw clutch. The clutch member 26 is secured to the rear end of the shaft section 8 by transverse connecting pins 29, held in place by cotter pins 30, as seen in Fig. 5, and the shaft, including the sections 7 and 8, is longitudinally shiftable by virtue of its annularly grooved intermediate collar 30, in which the depending intermediate yoke 31 of the shifting lever 32, as best seen in Fig. 2, is engaged. One end of this lever is pivotally mounted at 33 upon the frame extension 1, and its opposite end is provided with a handle 34 and an arcuately slotted bracket 35, upwardly through the slot 36 of which extends a clamping bolt 37, the latter being mounted through the frame extension 1ª and provided with a threaded end below the latter and a nut 38 engaged upon its threaded end and provided with a handle 39 whereby it may be readily and quickly adjusted to securely hold the shifting arm 32 in adjusted position, and as readily release the same.

Thus by the use of the shifting lever, my improved power transmitting attachment can be readily engaged with, and disengaged from the motor shaft before and after the use of the attachment for transmitting the power of the motor to an external point when the automobile is stationary.

The pins 29 connecting the clutch member 26 to the shaft section 8 are well calculated to withstand the strain and secure the clutch member in spite of its disposition upon the cylindrical portion of the said shaft section, which thus provides for a greater portion of the material of the latter within the clutch member than were it squared into the same as usual, the cotter pins 30 holding the connecting pins 29 in such manner as to permit of ready removal of the latter when desired.

It is obvious that the provision of two pairs of slots 28 in the clutch member forms double engaging jaws, thus calculated to double the length of its wear, and that the provision of a fan 16 driven in connection with the attachment, in addition to the usual fan of the motor from which the power is taken, is calculated to furnish ample cooling air when the automobile is stationary, and even when the automobile is in operation with the attachment connected thereto, and proceeding upgrade on low or reduced speed.

It is obvious of course that the material of which the several parts are made may be varied as well as the particular manner of connecting certain of the parts, the particular shape thereof as shown, and especially the construction of the frame in respect to its automobile engaging parts, whereby to adapt the same for engagement with the forward cross bars of various automobile frames.

I claim:—

1. An automobile attachment of the character described comprising a frame having means to detachably engage the forward cross bar of an automobile frame in forwardly projecting relation, a driven shaft mounted in said frame and having means to engage the automobile power shaft, a pulley carried by the said driven shaft, an arm inclined upwardly from one side of the attachment frame and movably connected thereto, a rod extending upwardly from the opposite side of said frame and connected to said arm, a fan supported by said arm, and a belt connecting the fan with the said driven shaft, said rod having an adjustable connection with the said frame, for the purpose described.

2. An automobile attachment of the character described, comprising a U-shaped frame having the ends of its extensions provided with means to detachably engage the forward cross bar of the automobile frame, and having a forward centrally disposed bearing, an axially movable shaft having a forward enlarged portion journaled in the said bearing, and having a rear reduced portion provided with a clutch at its rear end, a pulley detachably connected to the forward end of the enlarged portion of the shaft, and a lever in connection with the frame having a yoke engaging a portion of the shaft whereby to shift the latter longitudinally in its bearing on the frame.

3. An automobile attachment of the character described, comprising a U-shaped frame having the rear ends of its extensions provided with clamps for detachable engagement with the forward cross bar of the automobile frame, a supporting arm pivotally connected at its forward end to the lower forward end of the said U-shaped frame, and projecting rearwardly between the extensions of the frame, said supporting arm being also provided at its rear end with means to adjustably and detachably engage the forward cross bar of the automobile frame, and power transmitting connections carried by the said detachable frame and having means to engage the motor shaft of the automobile.

4. An automobile attachment of the character described comprising a frame detachably engageable with the automobile frame in forwardly projecting relation, a longitudinally shiftable shaft carried by said detachable frame for engagement with the motor shaft of the automobile, and having a pulley at its forward end, and means for shifting the said shaft longitudinally into and out of engaged position, including an annularly grooved collar carried by the shaft, a shifting lever mounted on the detachable frame and provided with a yoke in engagement with the said grooved collar, and means connecting the said detachable frame and the said shifting member whereby the latter may be secured in adjusted position.

THEODORE PAULSEN.

Witnesses:
O. R. BINGHAM,
MARVAN McDORMED.